(12) United States Patent
Kazempour (10) Patent No.: US 11,724,651 B2
(45) Date of Patent: Aug. 15, 2023

(54) SMART PHONE MOUNT FOR VEHICLES

(71) Applicant: Shahroukh M. Kazempour, Lynwood, WA (US)

(72) Inventor: Shahroukh M. Kazempour, Lynwood, WA (US)

( * ) Notice: Subject to any disclaimer, the term of this patent is extended or adjusted under 35 U.S.C. 154(b) by 421 days.

(21) Appl. No.: 17/138,769

(22) Filed: Dec. 30, 2020

(65) Prior Publication Data

US 2022/0203905 A1  Jun. 30, 2022

(51) Int. Cl.
*B60R 11/02* (2006.01)
*F16M 13/02* (2006.01)
*F16B 1/00* (2006.01)
*B60R 11/00* (2006.01)

(52) U.S. Cl.
CPC ............ *B60R 11/0241* (2013.01); *F16B 1/00* (2013.01); *F16M 13/02* (2013.01); *B60R 2011/001* (2013.01); *B60R 2011/007* (2013.01); *F16B 2001/0035* (2013.01)

(58) Field of Classification Search
CPC ......... B60R 2011/001; B60R 2011/007; F16B 1/00; F16B 2001/0035; F16M 13/02
See application file for complete search history.

(56) References Cited

U.S. PATENT DOCUMENTS

| | | | | |
|---|---|---|---|---|
| 7,374,142 B2* | 5/2008 | Carnevali | ............... | F16M 13/00 224/183 |
| 8,757,461 B2* | 6/2014 | Zanetti | .................... | B60R 11/02 224/483 |
| 9,616,821 B2* | 4/2017 | Elharar | .................. | F16M 13/02 |
| 10,078,346 B2* | 9/2018 | Lay | ......................... | F16M 11/38 |
| 10,237,384 B2* | 3/2019 | Holder | ............... | B60R 11/0241 |
| 10,292,514 B1* | 5/2019 | Kuhn | ...................... | B63B 17/00 |
| 10,304,429 B1* | 5/2019 | Broadbelt | ............. | F16M 11/22 |
| 10,322,764 B2* | 6/2019 | Thomas | ................ | F16C 11/106 |
| 10,988,197 B1* | 4/2021 | Hamilton | ............... | B62J 50/225 |
| 2010/0081377 A1* | 4/2010 | Chatterjee | ............. | G06F 1/1632 455/41.1 |
| 2011/0140474 A1* | 6/2011 | Smith | .................... | B62D 27/06 296/35.1 |
| 2014/0077044 A1* | 3/2014 | Witter | .................. | H01F 7/0263 403/324 |
| 2014/0191099 A1* | 7/2014 | Schwarz | ............. | F16M 13/005 294/137 |
| 2014/0355200 A1* | 12/2014 | Thiers | ..................... | H04M 1/04 361/679.41 |
| 2016/0052462 A1* | 2/2016 | Heilgendorf | ............. | B60R 7/10 224/274 |
| 2016/0106202 A1* | 4/2016 | Ford | .................... | H04N 19/103 224/267 |
| 2016/0259374 A1* | 9/2016 | Breiwa | ..................... | F16B 1/00 |
| 2016/0318455 A1* | 11/2016 | Zhang | ................ | F16M 11/2021 |
| 2016/0347257 A1* | 12/2016 | Buchanan | ............. | F16M 13/00 |
| 2016/0373152 A1* | 12/2016 | Schmidt | ............... | F16M 11/105 |
| 2017/0240119 A1* | 8/2017 | Tezino | ................. | F16M 13/022 |

(Continued)

*Primary Examiner* — Brian D Nash
(74) *Attorney, Agent, or Firm* — Arjomand Law Group PLLC (57) ABSTRACT

Apparatus and methods are disclosed for detachably attaching a smart phone or an electronic device to the steering wheel of a vehicle to keep the electronic device substantially in the line of sight of the driver and to prevent the driver from moving his/her head while trying to look at the smart phone or electronic device.

20 Claims, 10 Drawing Sheets

(56) References Cited

U.S. PATENT DOCUMENTS

| | | | |
|---|---|---|---|
| 2018/0363689 A1* | 12/2018 | Richter | B60R 11/00 |
| 2020/0217450 A1* | 7/2020 | Fabec | F16M 11/041 |
| 2020/0268108 A1* | 8/2020 | Fiedler | A45C 13/10 |
| 2021/0041057 A1* | 2/2021 | Jankura | F16M 11/10 |
| 2021/0063108 A1* | 3/2021 | Parsons | B60R 7/14 |
| 2021/0178862 A1* | 6/2021 | Alves | B60R 11/02 |
| 2022/0170503 A1* | 6/2022 | Bleckat | F16B 5/00 |
| 2022/0228709 A1* | 7/2022 | Chao | F16B 1/00 |

\* cited by examiner

SMART PHONE MOUNT FOR VEHICLES

CROSS-REFERENCE(S) TO RELATED APPLICATION(S)

None

TECHNICAL FIELD

This application relates generally to a smart-phone holder for a vehicle. More specifically, this application relates to a magnetic smart-phone holder that clips or clamps onto the steering wheel of the vehicle.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments of the smart phone holder provided herein is illustrative of the present disclosure and should not limit the scope of the disclosure as claimed. In addition, while the following description references using plastic and metal parts and specific clips and clamps and specific magnet arrangements and specific mechanisms for attaching the clips and clamps to the base of smart phone holder, it will be appreciated that the disclosure includes many more designs, materials, and methods of constructing the smart phone holder with different mechanisms for detachably attaching the smart phone holder to the steering wheel of a vehicle.

At least within the last two decades, cellular telephones ("cell phones") have become ever more popular as their abilities have increased. In addition to being telephones, the now-common "smart phone" is a personal data assistant, a screen for photos and videos, an Internet browser, a text messenger, a music player, an email portal, a method of payment, a map, a direction finder, a scanner, a camera and has many other uses and functions. Because of its expanded functions, it has become common for people to carry their smart phones all of the time. Since for many people much of their day is spent inside of a vehicle, smart phone mounts have been developed that attach the smart phone to various locations in the vehicle interior, such as to the windshield, to a heating/air conditioning vent, to the gear stick, or even to the cup holder.

Available device mounts have many drawbacks. For instance, suction cup mounts are typically large, bulky and require a large clean and smooth mounting surface such as a windshield. Device mounts often fail to properly and consistently attach to the mounting surface. Some device mounting solutions require adhesive to secure the mount to a vehicle dash, wearing off over time and leaving an undesirable residue on the mounting surface. Current device mounts also fail to effectively accommodate a broad range of devices or mounting surfaces. Because of the deficiencies in the currently available device mounts, people choose not use electronic device mounts and often violate state and provincial hands-free driving laws. Other state and provincial laws prohibit objects mounted to the windshield to prevent obstruction of the driver's view.

A great disadvantage of the currently available device mounts is that the driver of the vehicle needs to turn her head each time that she wants to look at her device. This may happen several times per minute and can cause accidents and serious injuries. The present specification discloses improved, portable, and detachable device holder systems and methods for manufacturing them.

Figure 1:
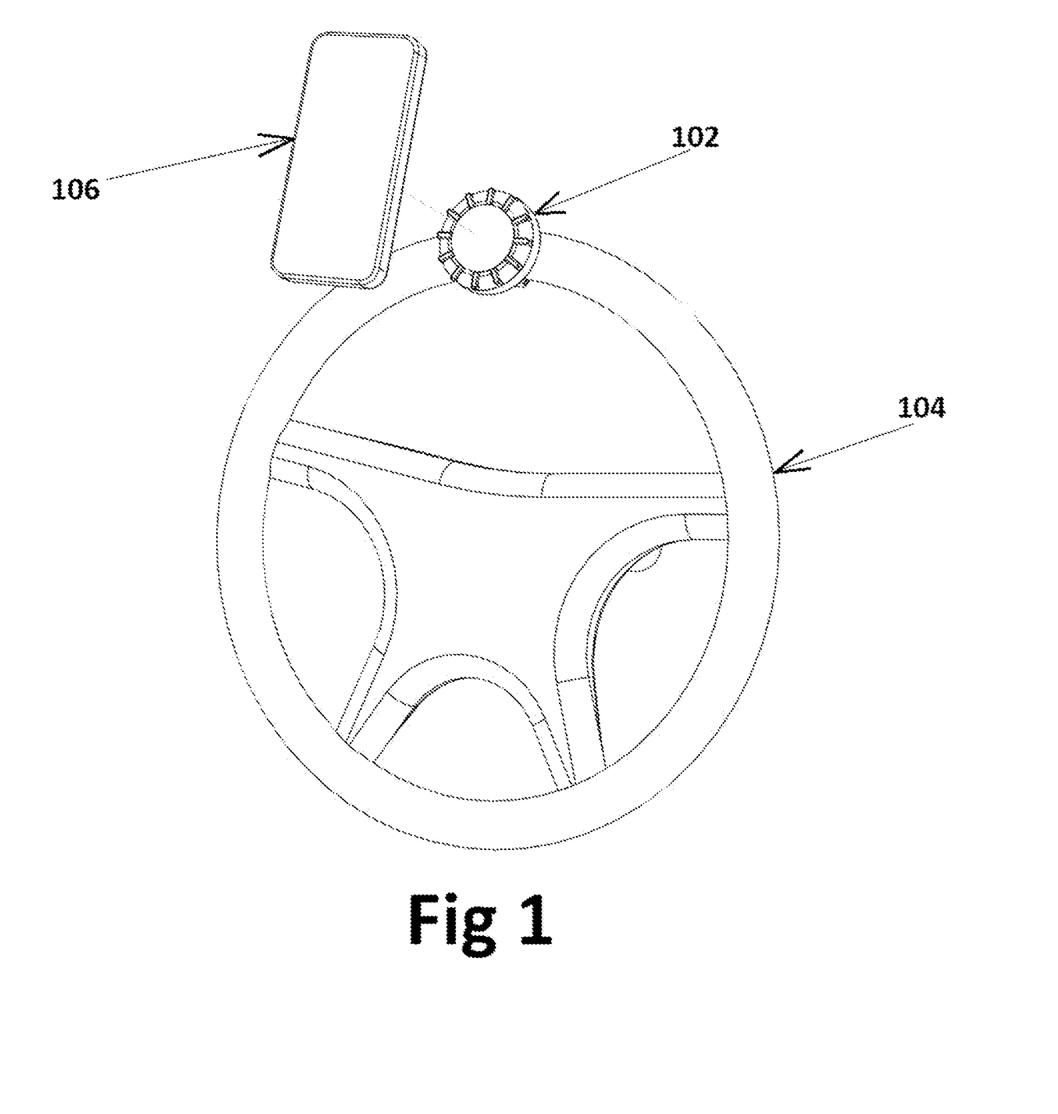
FIG. 1 shows an example of a smart phone holder that is detachably attached to a steering wheel of a vehicle and can magnetically hold a smart phone.

FIG. 1 illustrates an example embodiment of a new smart-phone holder (hereinafter, "SPH") 102 that is detachably attached to the steering wheel 104 and can magnetically hold smart phone 106. The example SPH 102 of FIG. 1 is basically constructed from a few plastic parts, a rubber part, a few metal parts, and a permanent magnet. This SPH 102 and its other embodiments keep electronic devices substantially in the line of sight of the driver and prevent the driver from moving her head while trying to look at the electronic device. The size of the SPH 102 does not need to be more than the diameter (thickness) of the steering wheel so that it does not obstruct any part of the drivers' view.

Figure 2:
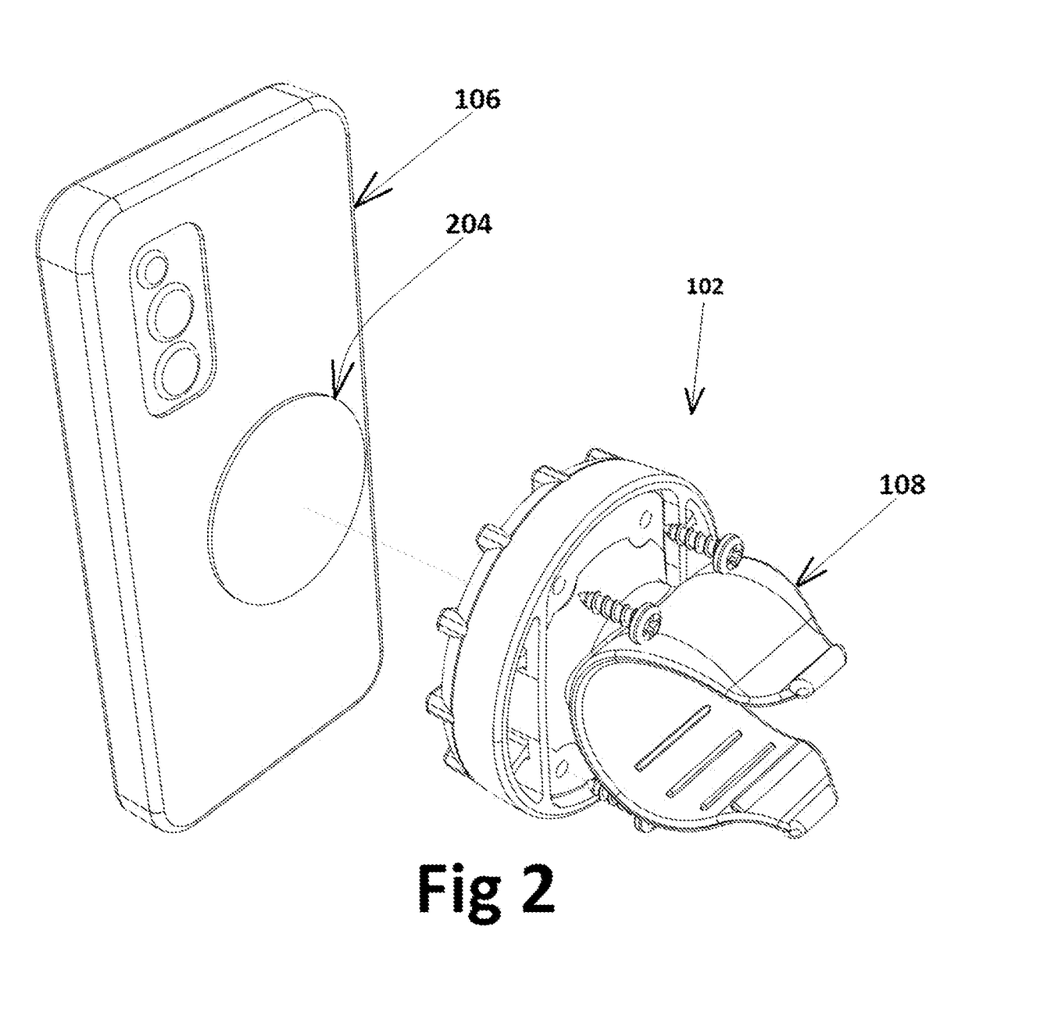
FIG. 2 illustrates a perspective view of the example smart phone holder of FIG. 1 and a magnetically attractable plate affixed to the back of the smart phone.

FIG. 2 illustrates a perspective view of the example SPH 102 and the smart phone 106 of FIG. 1 and a relatively thin plate 204 that is attached to the back of the smart phone 106. Plate 204 may be made of any material that is attracted to a magnet, such as iron, steel, cobalt and nickel. Plate 204 may even be an off-the-shelf steel washer. As seen in FIG. 2, clip 108, which is a part of SPH 102, is designed to detachably attach to the steering wheel of any vehicle.

In this specification "clip" is used for a device that tightly grabs, hugs, and holds the steering wheel by a spring action that is caused by a traditional spring or by the elasticity of the material of the clip. For example in the embodiment of FIG. 2, "clip" 108 is made of a plastic that has some elasticity and upon opening and placing it around the steering wheel it will tightly hold the steering wheel. A "clip" does not need to completely surround the steering wheel, although it may. Furthermore, in this specification the word "clamp" is designated to those devices that completely surround the steering wheel and form a closed-loop around the steering wheel. As will be described in the following paragraphs, the two ends of a "clamp" are detachably locked together.

The preferred position of the SPH 102 is on the most upper point of a steering wheel when the vehicle travels in a straight line. One of the advantages of the SPH 102 being attached to the most upper point of the steering wheel is that the smart phone remains in the line of sight of the driver and the driver will not need to move her head at all to look at her smart phone. Also, the attaching and detaching of the SPH 102 to the steering wheel is very easy and take only a fraction of a second.

Figure 3:
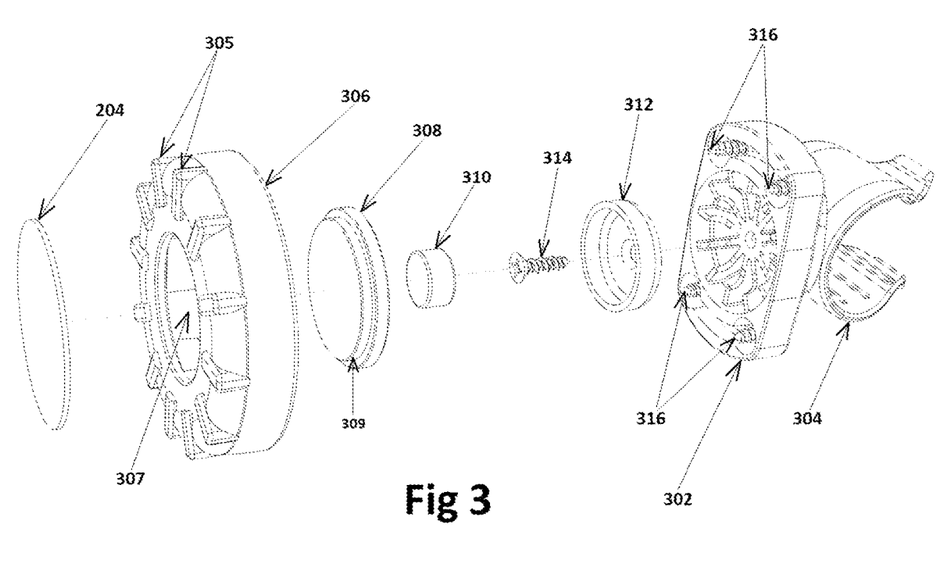
FIG. 3 illustrates an exploded view of the exemplary smart phone holder of FIG. 1 and the magnetically attractable plate of FIG. 2.

FIG. 3 illustrates an exemplary exploded view of the SPH 102 of FIG. 1 and the plate 204 of FIG. 2. In this embodiment the SPH 102 is comprised of a plastic cap 306 which forms and includes an opening 307 in its center. It must be noted that while in these examples cap 306 and opening 307 are generally shown as circular, they can have any geometric shape such as a rectangle, square, octagon, triangle, etc. For example, cap 306 may be octagonal and opening 307 may be square shaped. An elastic diaphragm 308, which is made of materials such as rubber or latex, is situated behind cap 306; between the cap 306 and base 302. Diaphragm 308 is designed so that its top part 309 can enter the opening 307 but the other part(s) of the diaphragm 308 cannot pass through the opening 307. After its placement behind cap 306 and within opening 307, diaphragm 308 becomes a flexible and conforming partition between the magnet 310 and plate 204.

The magnet 310 is sandwiched between the diaphragm 308 and the cup 312 which itself is attached to the base 302, for example, by a screw 314. Cup 312 may be made of any material that is attracted to a magnet and/or direct magnetic field, such as iron, steel, cobalt and nickel. The magnet 310 is placed in the cup 312 such that one of its magnetic poles, S or N, is in physical contact with or substantially close to the inner bottom of the cup 312 and the other magnetic pole is substantially close to or in physical contact with the top part 309 of diaphragm 308. The edge of the surrounding wall of the cup 312, which may be called rim or brim of the cup 312, is situated close to or in physical contact with the top part 309 of diaphragm 308. The proximity of the rim/brim of cup 312 with one of the magnetic poles of the permanent magnet 310, at the same time that cup 312 is in contact with or very close to the other pole of the magnet 310, will focus and gather the magnetic flux of magnet 310 between the rim of cup 312 and the nearby pole of magnet 310. This gathering of the flux of magnet 310 will create a strong magnetic force substantially concentrated on an imaginary plane passing through the top part 309 of diaphragm 308. This concentrated magnetic force can easily attract plate 204 to diaphragm 308 when plate 204 comes close to diaphragm 308.

Plate 204 may have any geometric shape or as was mentioned before, it can be a regular washer with a hole in its center. The ridges 305 allow the user to effortlessly separate the smart phone from the cap 306 by inserting the tip of the user's fingers between the back of the phone and the cap 306. Another benefit of the ridges 305 is the placement of the plate 204, after it is attracted by the magnet 310, in a depression created in the center of all the ridges 305. The only possible motion of plate 204 in this position, depending on its geometry and the geometry of the depression, is a circular motion. The secure position of plate 204 within the depression in the center of all the ridges 305 will keep the smart phone tightly attached to the cap 306 of the SPH 102 and therefore securely attached to the steering wheel.

In various embodiments, the cap 306 is permanently or detachably attached to base 302, for example, by four screws 316 or by any other known method. The union of cap 306 and base 302 will retain diaphragm 308, magnet 310, and cup 312 in a fixed and predetermined relation to each other, to the cap 306, and to the base 302. Also, in various embodiments the steering wheel clip 304 may be an integral part of base 302 or be a separate part that is attachably, detachably, moveably, and/or immovably attached or affixed to the base 302. In some embodiments a clamp may be used in place of the steering wheel clip 304. In various embodiments each one of the parts shown in FIG. 3 may be an assembly of other smaller parts.

Figure 4:
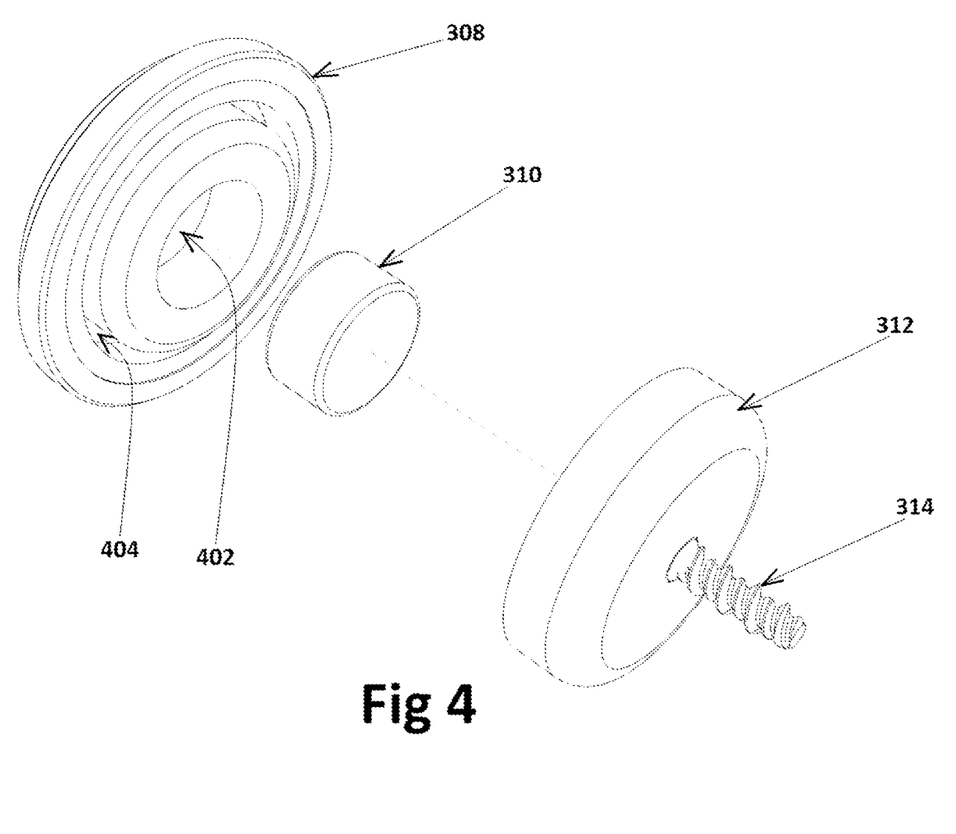
FIG. 4 illustrates an exemplary exploded view of a part of the smart phone holder of FIG. 1 from another angle.

FIG. 4 illustrates an exploded view of a sub-system of the SPH 102 of FIG. 1, from a new angle. In this view, diaphragm 308, magnet 310, cup 312 and screw 314 which attaches cup 312 to base 302, are seen from behind. In the exemplary embodiment depicted in FIG. 4, the elastic diaphragm 308 has a magnet-cavity 402 to deploy the magnet 310 therein and a circular cavity 404 to accommodate the rim of cup 312. This arrangement of cavities 402 and 404 will keep magnet 310 in the center of cup 312 while one of the poles of the magnet 310 is in contact or in close proximity of the bottom of cup 312. This tight and precise arrangement creates a strong magnetic field over the diaphragm 308 that is always ready to attract and strongly hold plate 204, which is attached to the smart phone.

Figure 5:
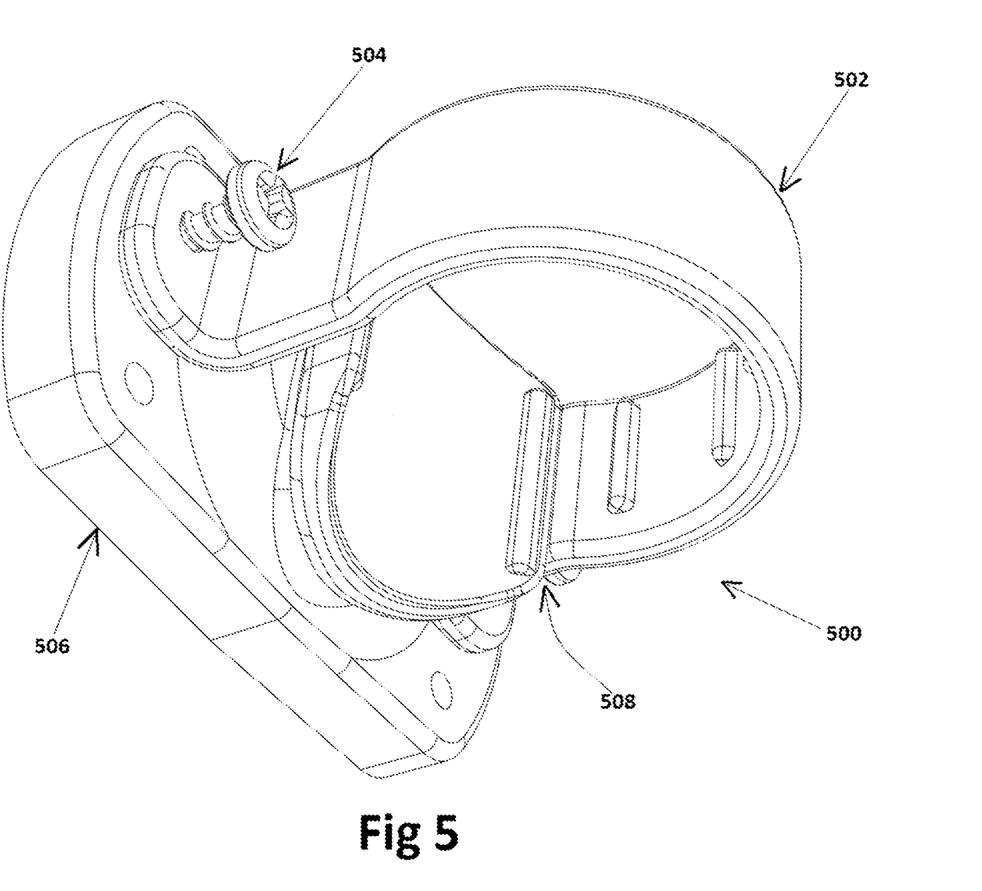
FIG. 5 illustrates an exemplary view of a clamp that in some embodiments replaces the clip shown in FIG. 2.

FIG. 5 illustrates an exemplary view of a clamp 500 that in some embodiments replaces clip 108 shown in FIG. 2. One part of this simple clamp 500 is a flexible band 502 which is attached from one end to the support 506 by a screw 504. In some embodiments the flexible band 502 may be an integral part of support 506 or may be glued to or fused into the support 506. In various embodiments support 506 itself may be an integral part, a permanently attached part, or a detachable part of base 302 in FIG. 3. The other free end of the flexible band 502 wraps around the steering wheel and locks into the locking mechanism 508, which is a section of support 506. The locking mechanism 508, a part of which is attached to or is an integral part of one end of band 502 and the other part of which is attached to or is an integral part of support 506, is known to those skilled in the art and may be designed in a number of ways.

Figure 6:
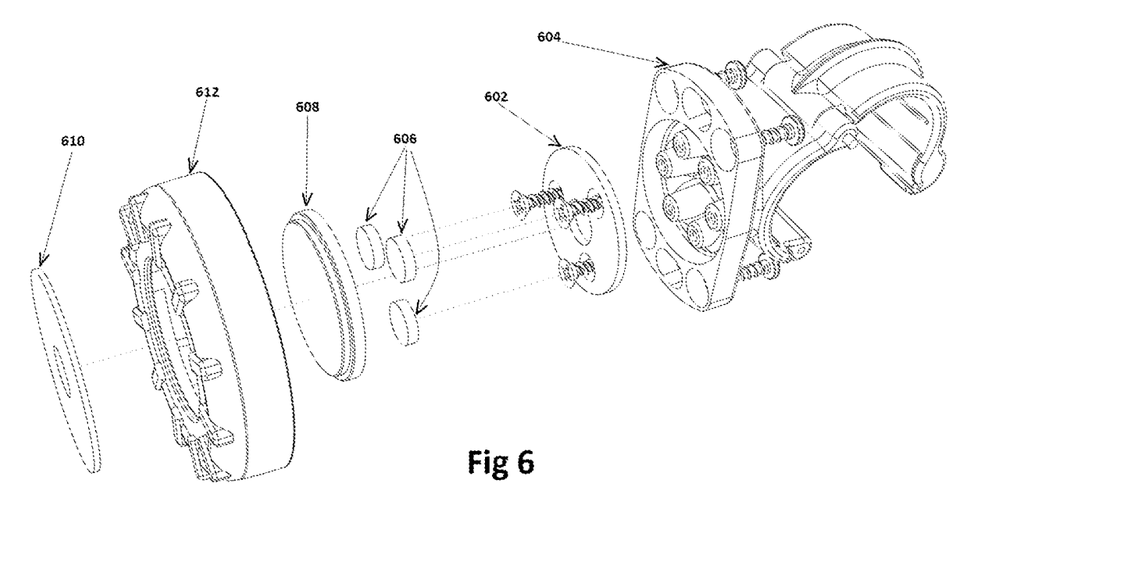
FIG. 6 illustrates an exploded view of an exemplary smart phone holder, using more than one magnet, according to a different embodiment of the disclosed apparatus.

FIG. 6 illustrates an exploded view of an exemplary smart phone holder, using more than one magnet, according to a different embodiment of the disclosed apparatus. In this embodiment more than one magnet 606 are seated on a washer 602 that is attached to the base 604. The magnets' arrangement of this embodiment is such that either all of the north poles of the magnets 606 are in close proximity of washer 602 or all of the south poles of the magnets 606 are in close proximity of washer 602. In this embodiment it is preferable that plate 610, which is attached to the smart phone, be a washer too; however, any magnetically attractable plate without an opening in its center may be used instead of a washer. Similar to the embodiment shown in FIG. 3, an elastic diaphragm 608, which is made of materials such as rubber or latex, is placed behind cap 612; between the cap 612 and base 604. Diaphragm 608 is a flexible and conforming partition between magnets 606 and washer 610. In various embodiments diaphragm 608 may have magnet-cavities to accommodate magnets 606 and to prevent the magnets 606 from moving around. The particular arrangement of the plurality of magnets between two washers with an opening in each washer (hence the name "washer") will intensify the attraction force of the magnets, which in turn causes the magnets 606 to better hold plate 610 and the attached smart phone.

Figure 7:
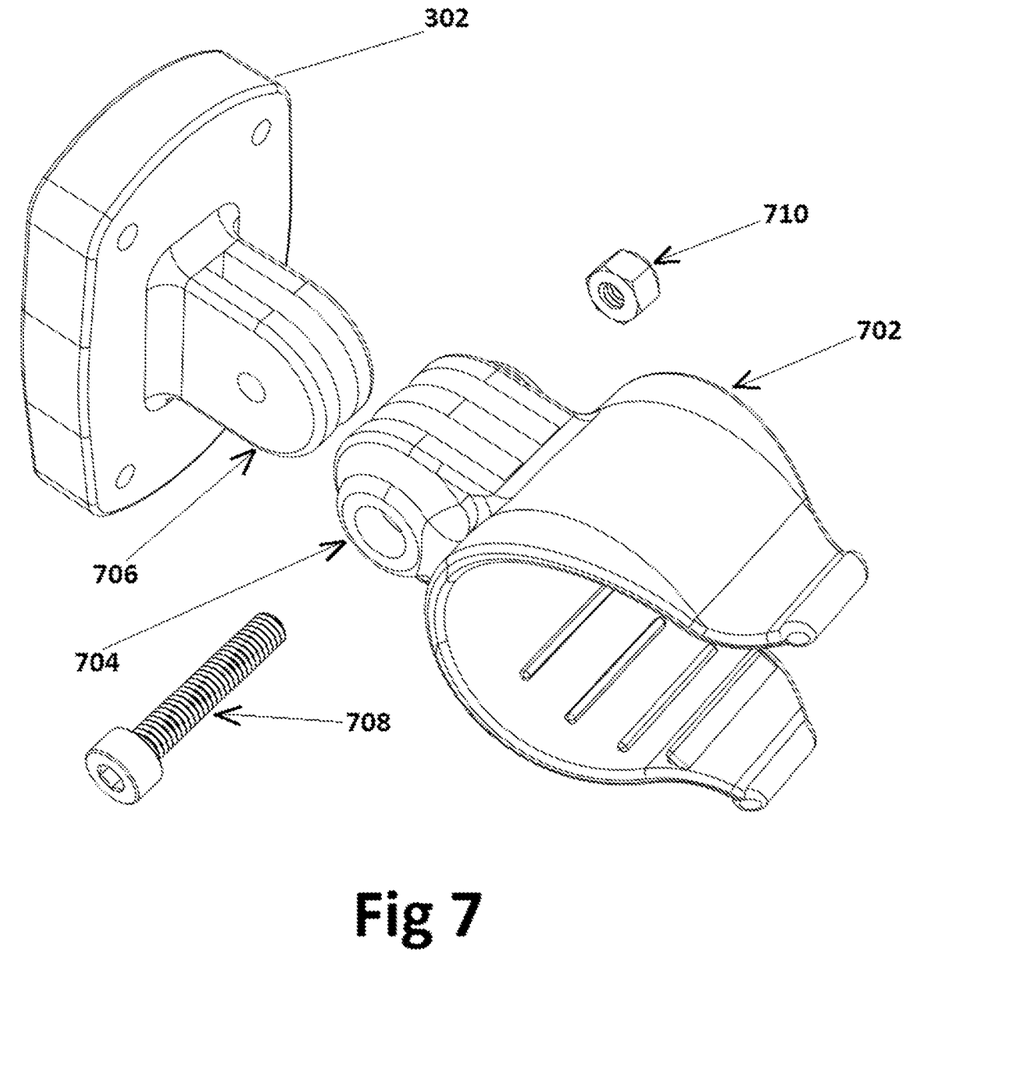
FIG. 7 illustrates an exemplary view of a smart phone holder clip and the mechanism of its attachment to the base of the smart phone holder base.

FIG. 7 illustrates an exemplary view of an SPH clip 702 and the mechanism of its attachment to the base 302 of the SPH. As shown in FIG. 7 the union and the engagement of section 704 of clip 702 with section 706 of base 302, which are held together by bolt 708 and nut 710, forms a hinge. In the arrangement of FIG. 7, clip 702 and base 302 can both turn around the longitudinal axis of bolt 708. Therefore, when clip 702 is attached to a steering wheel, base 302, and any smart phone magnetically attached to it, can still turn around the longitudinal axis of bolt 708. In contrast, in the previous embodiments base 302 and any clamp or clip attached to it could not move with respect to each other.

Figure 8:
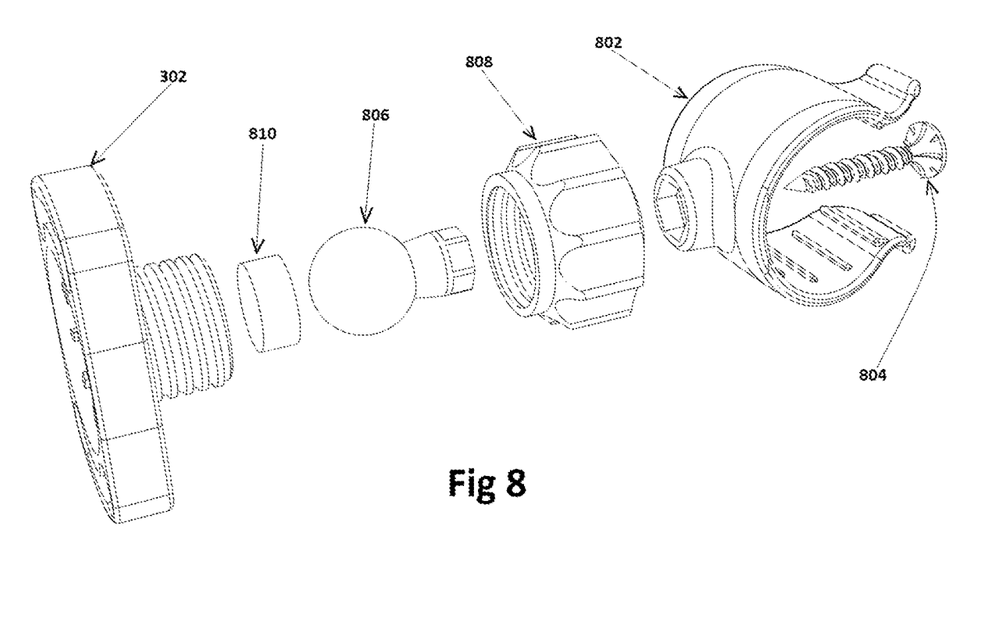
FIG. 8 illustrates an exemplary view of another smart phone holder clip and the ball and socket mechanism of its attachment to the base of the smart phone holder.

FIG. 8 illustrates an exemplary view of another SPH clip 802 and the ball 806 and socket mechanism of its attachment to the base 302 of the SPH. In this embodiment ball 806 is immovably attached, through an opening in nut 808, to clip 802 by, for example, screw 804. After nut 808 is screwed to base 302, their union forms a socket for the ball 806, around which base 302 can freely move. Therefore, when clip 802 is attached to a steering wheel, base 302, and any smart phone magnetically attached to it, can still turn in all directions. An optional elastic piece 810 may be used between the ball 806 and base 302 to eliminate any slack between the ball 806 and its socket formed by the union of nut 808 and base 302.

Figure 9:
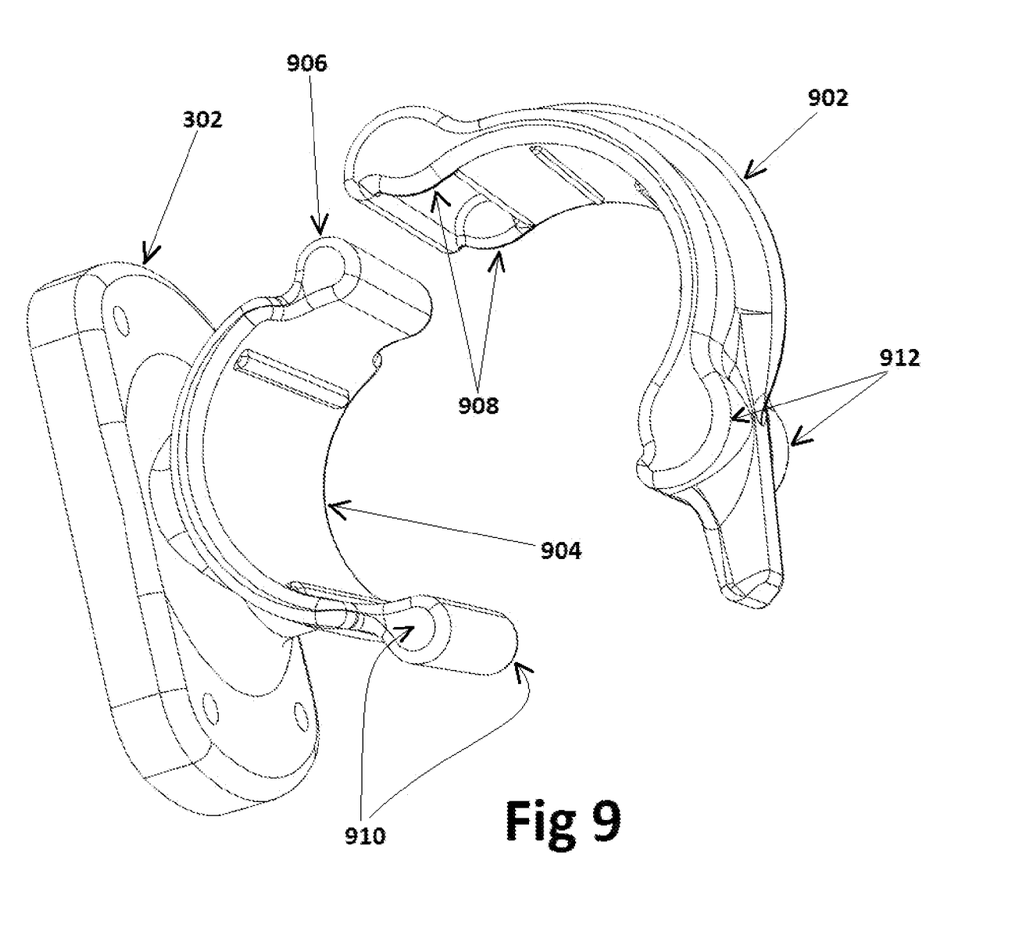
FIG. 9 illustrates an exemplary view of a smart phone holder clamp along with its hinge and locking mechanisms.

FIG. 9 illustrates an exemplary view of a SPH clamp along with its hinge and locking mechanisms. As shown in FIG. 9, the two strips 902 and 904 form a ring around the steering wheel for the attachment of a SPH to the steering wheel. One half of this ring, namely strip 904, is attached to the base 302 of the SPH, either as a separate piece or as an integral piece of base 302. The other half of this ring, namely strip 902, is rotatably attached from one end to one end of strip 904 and has a locking mechanism to attach from the other end to the other end of strip 904. The hinge mechanism that rotatably connects strips 902 and 904 together consists of two cavities or depressions 906 at both sides of one end of strip 904 and two protrusions 908 at both sides of one end of strip 902. This end of strip 902 elastically deforms and opens up to engage protrusions 908 with cavities 906. The locking mechanism of this embodiment is similar to its hinge mechanism where the elastic deformation of the other end of strip 902 engages the two protrusions 912 with cavities 910.

Figure 10:
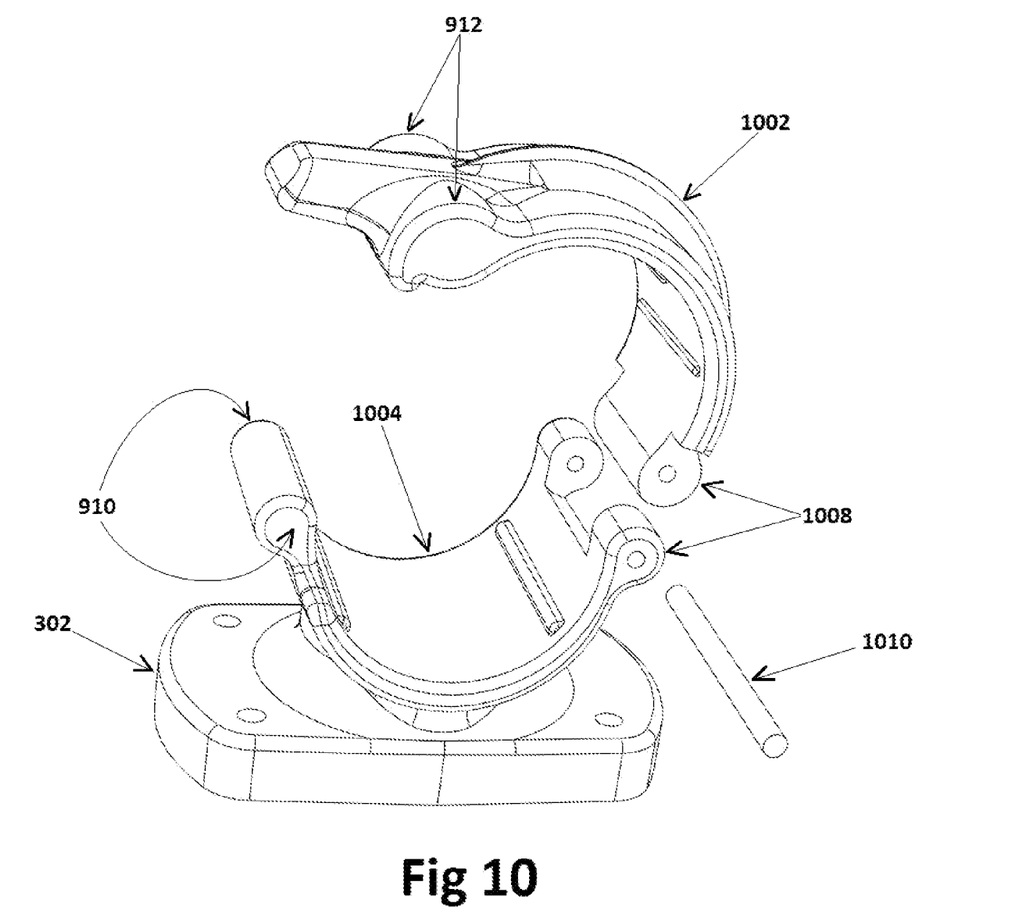
FIG. 10 illustrates an exemplary view of another smart phone holder clamp along with its hinge and locking mechanisms.

FIG. 10 illustrates an exemplary view of another SPH clamp along with its hinge and lock mechanisms. As shown in FIG. 10, the two strips 1002 and 1004 form a ring around the steering wheel for the attachment of a SPH to the steering wheel. One half of this ring, namely strip 1004, is attached to the base 302 of the SPH, either as a separate piece or as an integral piece of base 302. The other half of this ring, namely strip 1002, is rotatably attached from one end to one end of strip 1004 and has a locking mechanism to attach from the other end to the other end of strip 1004. The traditional hinge mechanism that rotatably connects strips 1002 and 1004 together consists of barrels 1008 and pin 1010. The locking mechanism of this embodiment is similar to the locking mechanism of FIG. 9 where the elastic deformation of the other end of strip 1002 engages the two protrusions 912 with cavities 910.

In various embodiments the base 302 is detachably is attached to the clip 304 or clamps of FIGS. 9 and 10, such as magnetically or by Velcro® or the like.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B," and also the phrase "A and/or B" will be understood to include the possibilities of "A" or "B" or "A and B."

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

I claim:

1. An electronic device holder for detachably attaching an electronic device to a steering wheel of a vehicle, the electronic device holder comprising:
    a magnet;
    a cup for concentrating magnetic flux of the magnet, wherein the cup holds the magnet in its interior such that a first pole of the magnet touches bottom of the cup and a second pole of the magnet remains substantially on a plane defined by brim of the cup;
    a housing base, to a first side of which the cup is attached;
    an elastically conforming diaphragm, wherein the cup and the magnet are situated between the elastically conforming diaphragm and the first side of the housing base;
    a housing cap to be attached to the housing base such that the elastically conforming diaphragm and the cup and the magnet are situated between the housing cap and the housing base, wherein the housing cap has an opening that exposes a portion of the elastically conforming diaphragm under which portion a second pole of the magnet and the brim of the cup are located to concentrate flux of the magnet substantially within the housing cap opening;
    a plurality of protrusions, on an outside surface of the housing cap, for facilitating separation of the electronic device from the housing cap, wherein the protrusions are arranged such that after a plate affixed to the electronic device is magnetically attracted to the outside surface of the housing cap by the concentrated flux of the magnet the plate will be surrounded by the protrusions; and
    a clip or a clamp, attached to a second side of the housing base, for attaching the housing base to the steering wheel of the vehicle.

2. The electronic device holder of claim 1, wherein the magnet is a permanent magnet.

3. The electronic device holder of claim 1, wherein the cup is made of iron, steel, nickel or cobalt.

4. The electronic device holder of claim 1, wherein the housing base and/or the housing cap is made of plastic.

5. The electronic device holder of claim 1, wherein the elastically conforming diaphragm is made of rubber or latex.

6. The electronic device holder of claim 1, wherein the clip or clamp is made of plastic.

7. The electronic device holder of claim 1, wherein the clip or clamp is fixedly or detachably attached to the housing base or is an integral part of the housing base.

8. The electronic device holder of claim 1, wherein the clip or clamp is attached to the housing base by a ball and socket joint or by a hinge.

9. The electronic device holder of claim 1, wherein a cross-section of the housing cap and housing base and the elastically conforming diaphragm are circular.

10. The electronic device holder of claim 1, wherein the housing base is an assembly of two or more sections.

11. The electronic device holder of claim 1, wherein the elastically conforming diaphragm has cavities for the magnet and for the brim of the cup.

12. An electronic device holder for detachably attaching an electronic device to a steering wheel of a vehicle, the electronic device holder comprising:
    At least two magnets;
    a first magnetically attractable washer for concentrating magnetic flux of the magnets, wherein the washer is magnetically attached to a same first pole of the magnets;
    a second magnetically attractable washer to be affixed to a side of the electronic device,
    a housing base, to a first side of which the first washer is attached;
    an elastically conforming diaphragm, wherein the magnets are situated between the diaphragm and the first washer;
    a housing cap to be attached to the housing base such that the elastically conforming diaphragm and the first washer and the magnets are situated between the housing cap and the housing base, wherein the housing cap has an opening that exposes a portion of the elastically conforming diaphragm under which portion a same second pole of the magnets are located to concentrate flux of the magnet substantially within the housing cap opening;
    a plurality of protrusions, on an outside surface of the housing cap, for facilitating separation of the electronic device from the housing cap, wherein the protrusions are arranged such that after a second washer, affixed to the electronic device, is magnetically attracted to the outside surface of the housing cap by the concentrated flux of the magnets the second washer will be surrounded by the protrusions; and
    a clip or a clamp, attached to a second side of the housing base, for attaching the housing base to the steering wheel of the vehicle.

13. The electronic device holder of claim 12, wherein the magnets are permanent magnets.

14. The electronic device holder of claim 12, wherein the first and the second washers are made of iron, steel, nickel and/or cobalt.

15. The electronic device holder of claim 12, wherein the elastically conforming diaphragm is made of rubber or latex.

16. The electronic device holder of claim 12, wherein the clip or clamp is fixedly or detachably attached to the housing base or is an integral part of the housing base.

17. The electronic device holder of claim 12, wherein the clip or clamp is attached to the housing base by a ball and socket joint or by a hinge.

18. The electronic device holder of claim 12, wherein a cross-section of the housing cap and housing base and the elastically conforming diaphragm are circular.

19. The electronic device holder of claim 12, wherein the housing base is an assembly of two or more sections.

20. The electronic device holder of claim 12, wherein the elastically conforming diaphragm has cavities for the magnet and for the brim of the cup.

\* \* \* \* \*